United States Patent
De Kock

(10) Patent No.: US 6,669,433 B1
(45) Date of Patent: Dec. 30, 2003

(54) DEVICE FOR HANDLING CONTAINERS FOR ROAD TRANSPORT

(76) Inventor: Hugo De Kock, Hellekouterweg 5, B-3090 Overijse (BE)

( * ) Notice: Subject to any disclaimer, the term of this patent is extended or adjusted under 35 U.S.C. 154(b) by 0 days.

(21) Appl. No.: 09/598,156

(22) Filed: Jun. 21, 2000

(30) Foreign Application Priority Data

Jun. 21, 1999 (EP) .............................................. 99304847

(51) Int. Cl.⁷ ................................................ B60P 1/28
(52) U.S. Cl. ..................................... 414/498; 414/491
(58) Field of Search ..................... 414/491, 498–500, 414/546, 547, 494; 280/434

(56) References Cited

U.S. PATENT DOCUMENTS

| | | | | |
|---|---|---|---|---|
| 3,441,158 A | | 4/1969 | Wilson ........................ | 214/672 |
| 3,567,056 A | * | 3/1971 | Mason ........................ | 214/771 |
| 3,888,514 A | * | 6/1975 | Klein ........................... | 280/434 |
| 3,892,323 A | * | 7/1975 | Corompt ..................... | 214/505 |
| 3,942,664 A | * | 3/1976 | Lemaire ...................... | 214/505 |
| 4,327,533 A | * | 5/1982 | Sterner ....................... | 212/292 |
| 4,453,878 A | * | 6/1984 | Paukku ........................ | 414/491 |
| 5,362,184 A | * | 11/1994 | Hull et al. .................... | 410/90 |
| 5,542,808 A | * | 8/1996 | Chiron et al. ................ | 414/498 |
| 5,839,745 A | * | 11/1998 | Cattau et al. ................ | 280/434 |

FOREIGN PATENT DOCUMENTS

| | | | | |
|---|---|---|---|---|
| DE | 3010852 | 10/1981 | | |
| EP | 0358541 | 3/1990 | | |
| FR | 1528767 | 10/1968 | | |
| FR | 2442213 | 6/1980 | | |
| FR | 2460802 | 1/1981 | | |
| FR | 2473965 | 7/1981 | | |
| GB | 1054978 | 1/1967 | | |
| GB | 1371812 | 10/1974 | | |
| GB | 2146974 | 5/1985 | | |
| WO | 9415813 | 7/1994 | | |
| WO | WO 94/15813 | * | 7/1994 | ............. B60P/3/42 |

* cited by examiner

Primary Examiner—Eileen D. Lillis
Assistant Examiner—Charles A. Fox
(74) Attorney, Agent, or Firm—Ladas & Parry

(57) ABSTRACT

A device with arms for hauling and handling containers allowing a semitrailer tractor vehicle to be converted as required. The invention also relates to a tractor vehicle equipped with this device. This device comprises a pivoting L-shaped hauling arm equipped, at its end, with a hook, with a tipper pivoting about a first horizontal axis, with actuating members for actuating the said tipper and with rollers for guiding a container.

The vehicle chassis supports a second pivot axis located forward of the point at which the vehicle chassis rests on its rear axle assembly.

A link rod is mounted so that it can pivot on the second axis and supports the L-shaped arm.

15 Claims, 9 Drawing Sheets

DEVICE FOR HANDLING CONTAINERS FOR ROAD TRANSPORT

FIELD OF THE INVENTION

The invention relates to a device with an arm for hauling and handling containers allowing a semitrailer tractor vehicle to be converted as required. The invention also relates to a tractor vehicle equipped with this device.

BACKGROUND OF THE INVENTION

The transport industry is increasingly faced with intensive use of equipment. Recourse to containers is significant in this respect because it is now no longer necessary to tie up an entire vehicle for the loading time, as is the case with a conventional truck with a dump body or curtain walls. Devices with arms (such as those described, for example, in EP-358 541 or GB 1 371 812) allow containers and dump bodies to be hauled, loaded and even tipped easily on transport vehicles.

There also exist vehicles which are intended for hauling semitrailers, essentially of the same power and same track. These vehicles are equipped, at the rear, with a fifth wheel which allows for the articulated connection of a semitrailer.

For reasons of size and mechanical strength, the presence of a fifth wheel is unfortunately incompatible with the presence of other items of equipment.

DESCRIPTION OF THE PRIOR ART

Various attempts have nonetheless been made at allowing multifunction use of vehicles. These include systems for the rapid removal of equipment items, and equipment-support gantries as described, in particular, in EP 0 513 623.

FR 1 528 767 describes a truck equipped with a lifting crane and with a fold-down bed that covers the fifth-wheel used for towing, thus affording a hybrid vehicle which is extremely ponderous and bulky and not very—or even not at all—suited to road traffic.

WO 94/15813 describes one with an arm and tipper in which a fifth wheel is mounted on the tipper, thus restricting the size of the fifth wheel and the payload, both in terms of traction and in terms of the weight that can be carried.

The search has been on to develop a robust device that can be fitted to standard vehicle chassis, that has mechanical properties that increase the load-carrying capabilities and haulage capabilities and which does not adversely affect the road-going qualities of the vehicle so equipped.

Another objective of the invention is that the device should be handleable in such a way as to accelerate load transfer. Another objective is that the device should not appreciably increase the tare of the vehicle.

BRIEF DESCRIPTION OF THE INVENTION

The subject of the invention is a device for handling a container, with an arm for an automotive vehicle comprising a pivoting hauling arm equipped with a hook, a tipper pivoting about a first horizontal axis and actuating members for actuating the said tipper. A chassis comprising a front part supports a second pivot axis. This pivot axis is located forward of the point at which the vehicle rests on its rear axle assembly, and a rear part supporting the first horizontal axis, which axis is offset downwards with respect to the upper plane of the vehicle chassis; a link rod is mounted so that it can pivot on the second axis. This link rod supports, with pivoting, an L-shaped arm at the end of which the hook is mounted. Actuating means are arranged between the said link rod and the base of the L-shaped arm.

The hooked part of the L-shaped arm is telescopic with respect to its base.

The respective proportions of the secondary arm, of the hooked part and of the base of the L-shaped arm are such that the hook can easily take hold of a container and haul it onto the vehicle chassis.

The vehicle is equipped with a fifth wheel fixed, possibly as part of the original equipment, to its chassis, the axis of the fifth wheel being located forward of the point at which the vehicle chassis rests on its rear axle assembly.

The fifth wheel may be a 3½" fifth wheel, which considerably increases the load-carrying and haulage capacities by comparison with a 2" fifth wheel. Thus, a conventional load of 55 tonnes can be extended to 110 tonnes.

According to the one advantageous embodiment, the base of the L-shaped arm is further articulated with respect to its hooked part and this makes the handling of a dump body easier.

According to the preferred embodiment, the base of the L-shaped arm is telescopic, and this saves weight by comparison with the above embodiment, and has the additional advantage that, using one sole basic device, containers of various lengths can be handled and that the device can be mounted with equal ease on different types of trucks (it can be adapted between 4.80 m and 5.30 m).

Furthermore, as the life of a handling device is longer than that of the vehicle on which it is mounted, this device can be readily transferred onto the successive vehicles of a fleet, thus improving its profitability.

The cross section of the base of the arm is preferably trapezoidal, rather than a conventional cross section, thus increasing its rigidity.

According to one embodiment, the front and rear parts of the chassis of the device are connected by a lowered longeron which does not protrude above the upper plane of the vehicle chassis.

As an option, the front and rear parts of the chassis are independent and fixed directly to the vehicle chassis, thus considerably lightening the weight of the mechanism and allowing the payload to be increased correspondingly.

As a preference, means for securing a container are arranged on the assembly formed by the tipper and the link rod.

The fifth wheel is advantageously equipped with a device for automatically, particularly pneumatically or hydraulically, securing the kingpin, thus allowing the driver to actuate it remotely.

According to one particular embodiment, the tipper is equipped with rollers that can be retracted downwards. These are, for example, mounted on an axis pivoting parallel to the first pivot axis.

This tipper is advantageously formed from sheet, this saving weight over a conventional lattice work structure and affording better protection of the underlying elements.

According to one preferred embodiment, when the device is in a position of rest, the tipper and its arms are arranged on the outside of the longerons that form the vehicle chassis. This makes for optimum lowering without the device thereby impinging on the volume of the rear axle assembly.

Another subject of the invention is an automotive vehicle with a front cab, advantageously equipped with a fifth wheel mounted on the chassis, which comprises a handling device as described hereinabove.

One advantage of the invention is that the device can be mounted directly on vehicles which are already equipped with conventional fifth wheels of all types.

Another advantage is that the fifth wheel remains, unmodified, at a standard height (1.35 m) from the ground, thus making manoeuvres easier for the drivers.

BRIEF DESCRIPTION OF THE DRAWINGS

Other specific features and advantages of the invention will become apparent from the description hereinafter, reference being made to the appended drawings, in which:

FIG. 8 is a view in cross-section of the L-shaped arm of the device.

FIG. 9 is a view in cross-section of the front part of the chassis of the device.

DETAILED DESCRIPTION OF THE DRAWINGS

Figure 1:
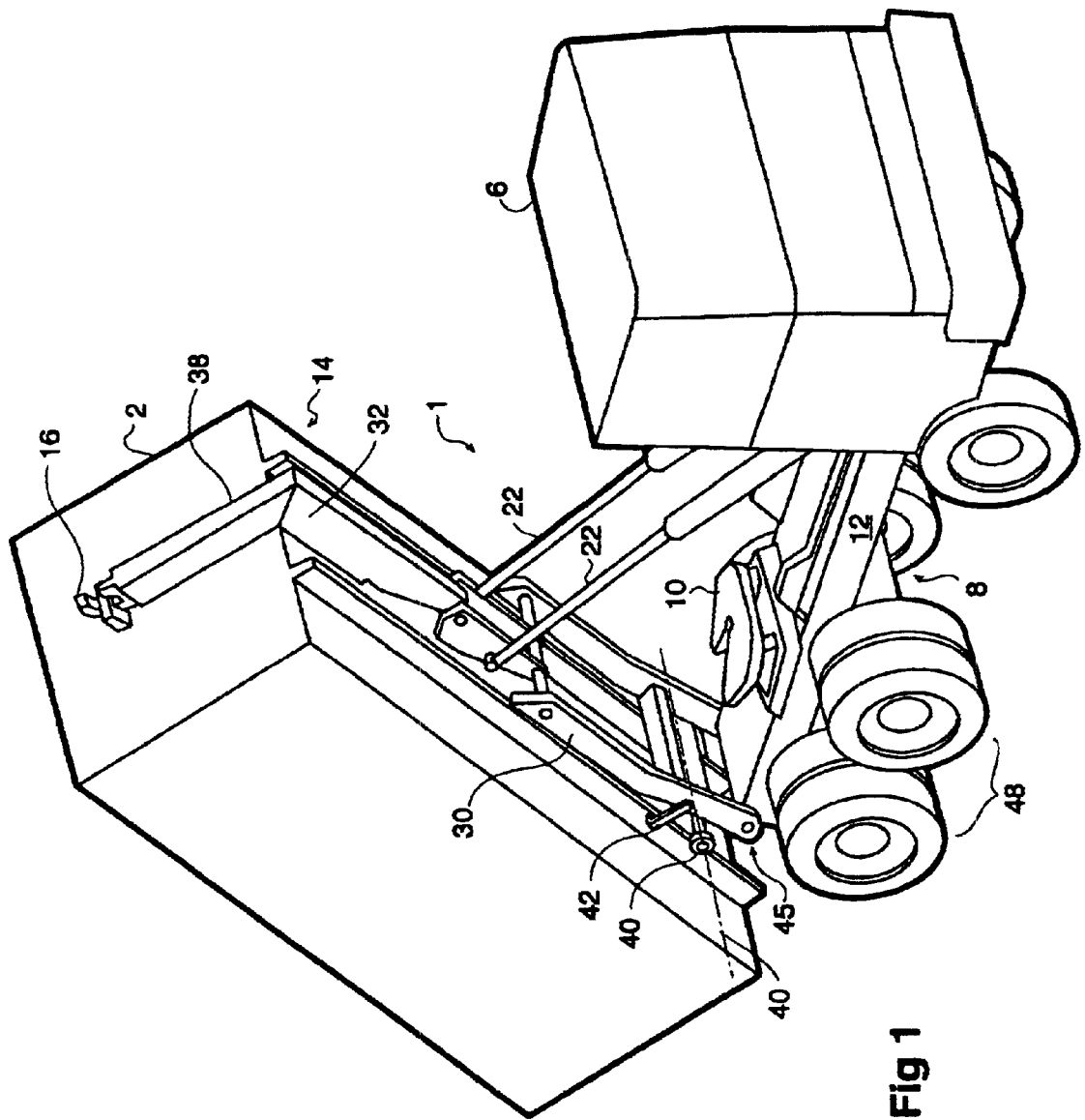
FIG. 1 is a perspective view of a device of the invention mounted on a truck, in the position for tipping a container.
Figure 2:
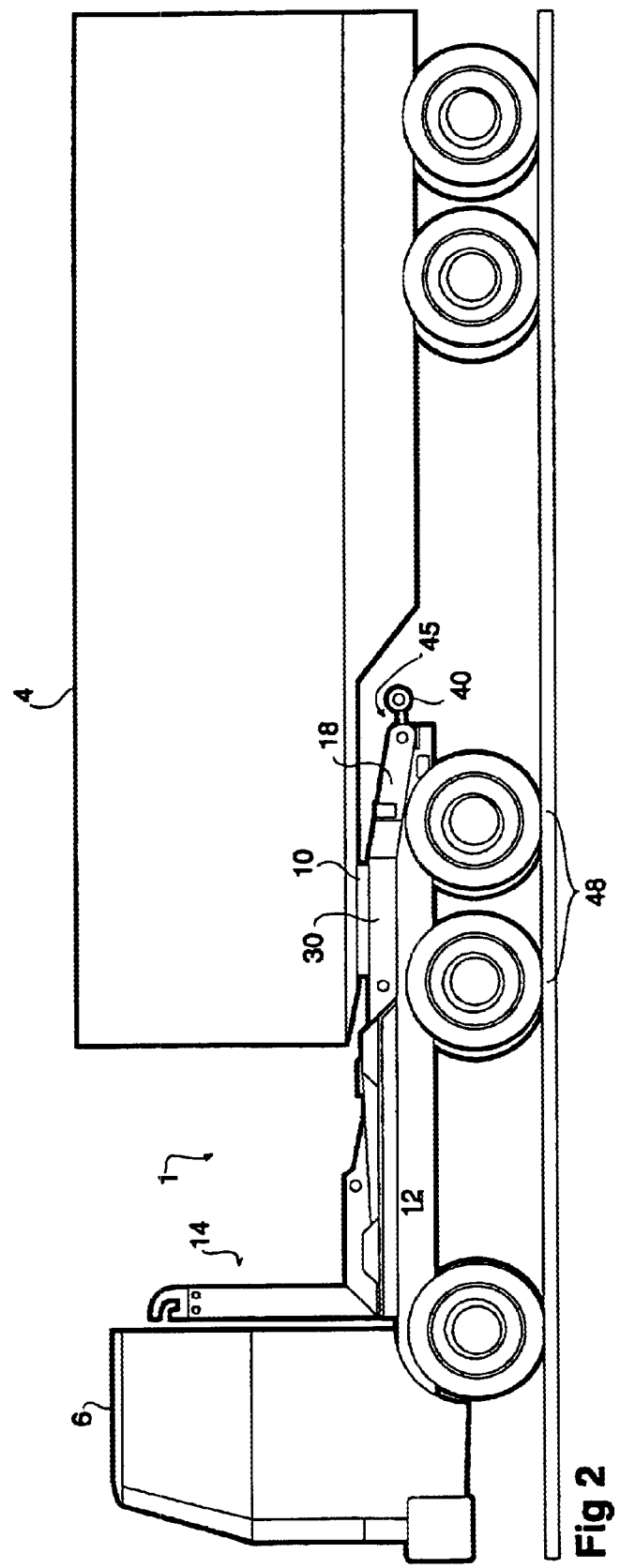
FIG. 2 is a diagrammatic side view of the device of the invention, mounted on a vehicle used as a semitrailer tractor.
Figure 3:
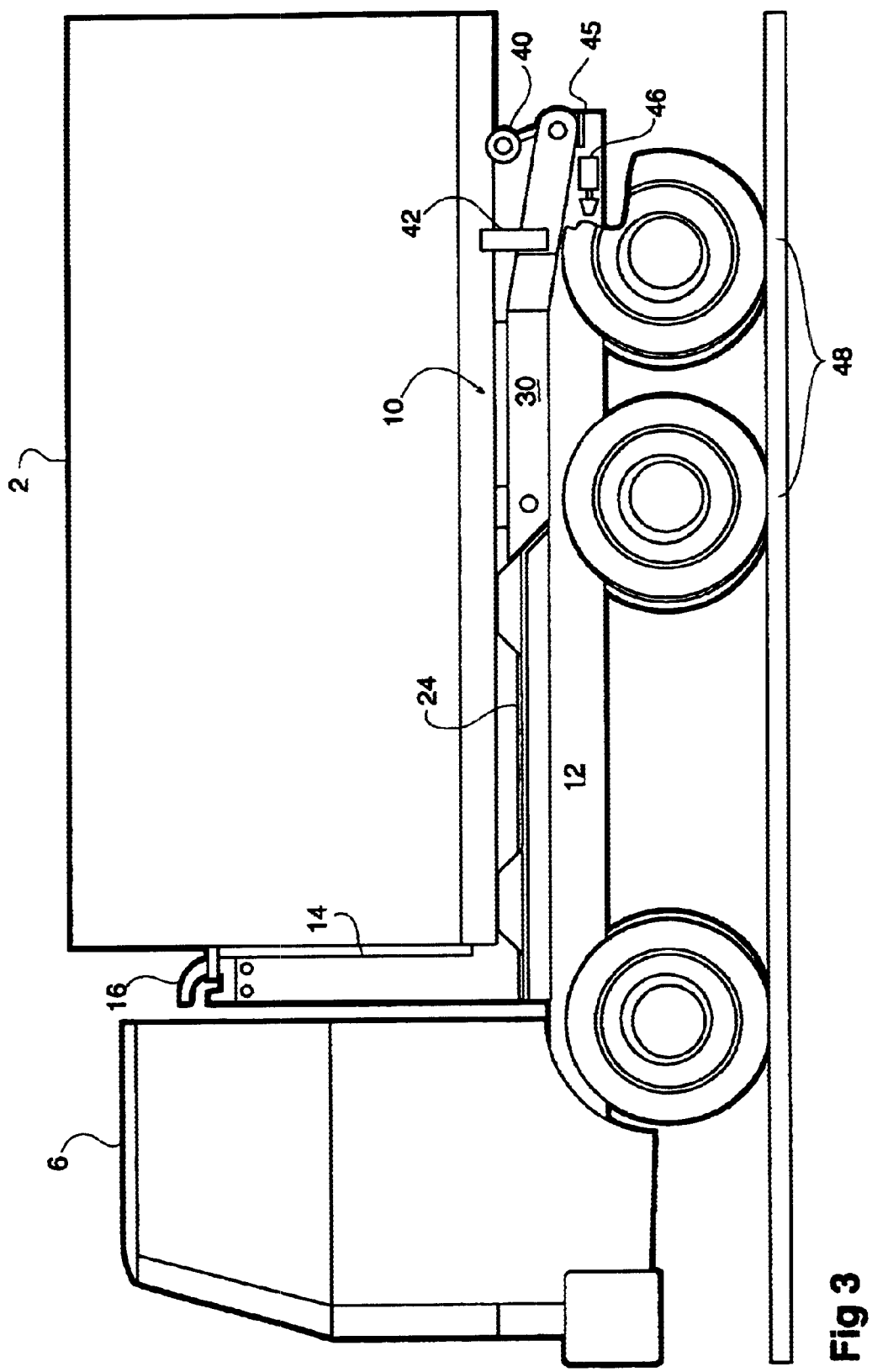
FIG. 3 is a side view of the device mounted on a vehicle, in the position for transporting a container.

FIGS. 1 to 3 show the various possible uses of a vehicle equipped with the device 1 according to the invention, either as a vehicle for transporting and handling a container 2 (FIGS. 1 and 3) with the possibility of loading and tipping (FIG. 1), or for hauling a semitrailer 4. The basic vehicle used may be any type of vehicle with a front cab 6 and a rear chassis 8. This vehicle may be equipped, as part of its original equipment, with a fifth wheel 10 used for towing, but the fifth wheel 10 may just as easily be added when mounting the device 1, or even at some later stage.

The device will be described, for reasons of clarity, with more particular reference to FIG. 4 in which it is depicted, on its own, in a tipping position, as it is in FIG. 1. It goes without saying that the various elements depicted are normally fixed to the longerons 12 of the rear chassis 8 of a vehicle.

Figure 5:
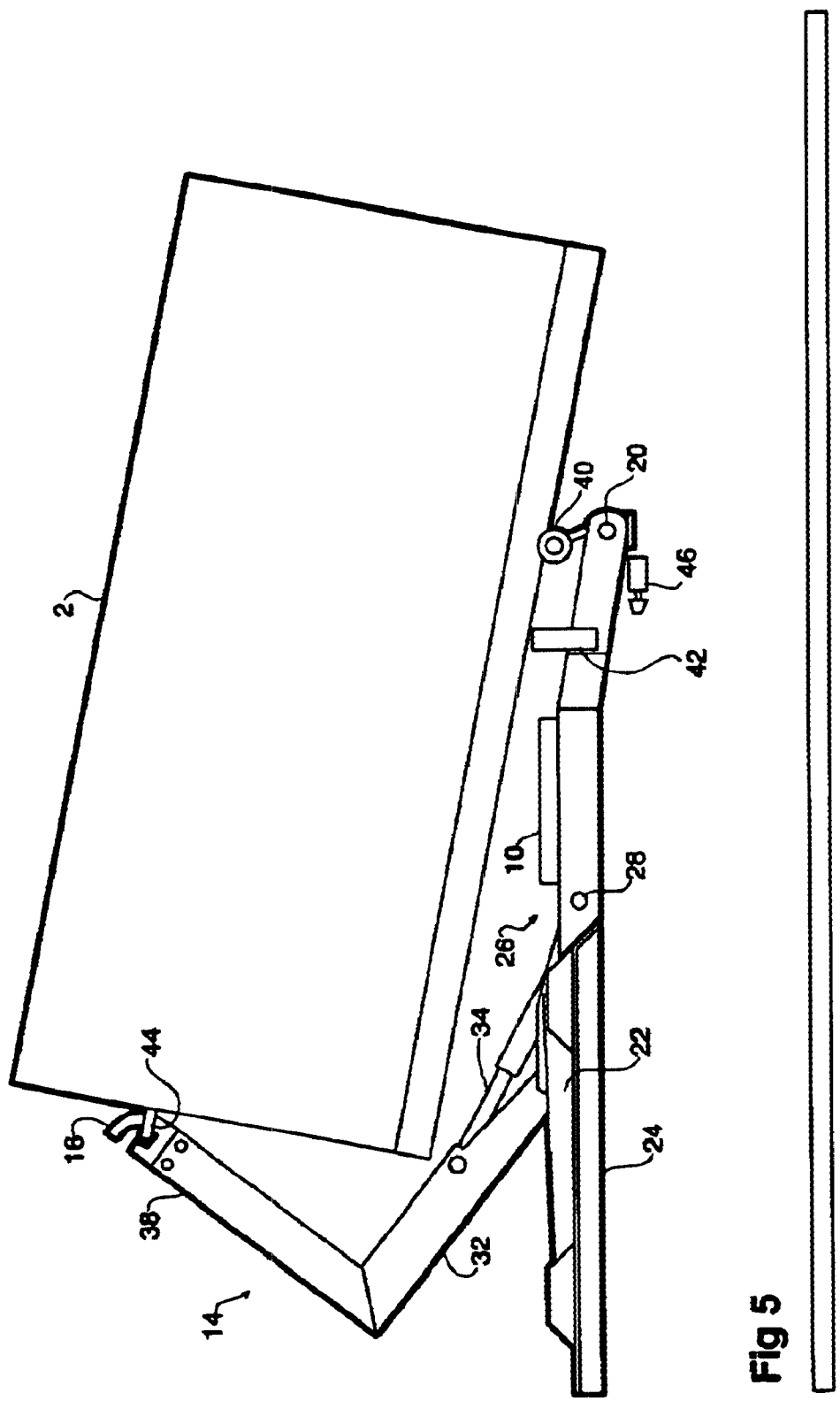
FIGS. 5 to 7 are side views of the device at various stages in manoeuvre for unloading a container.
Figure 6:
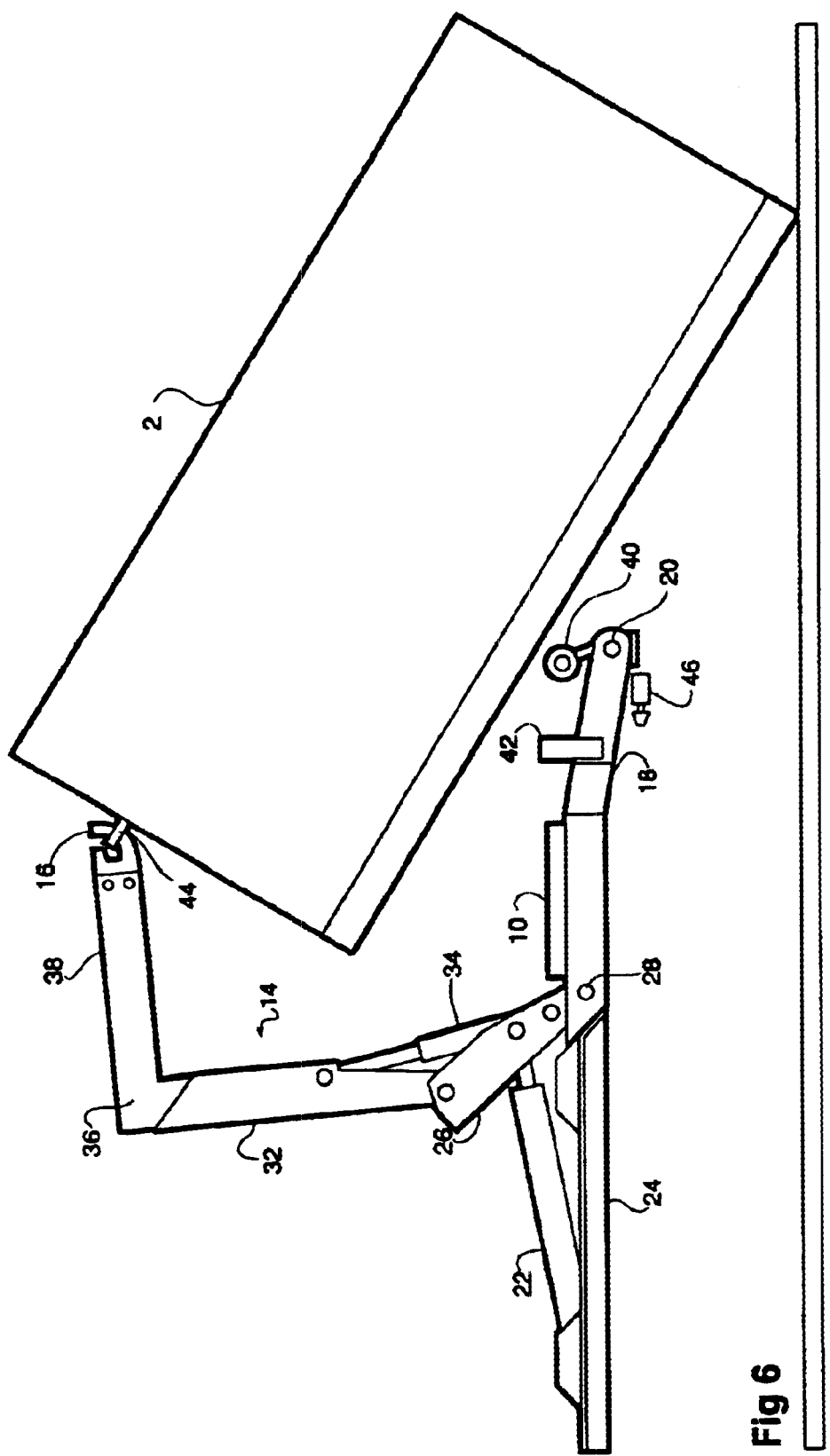
Figure 7:
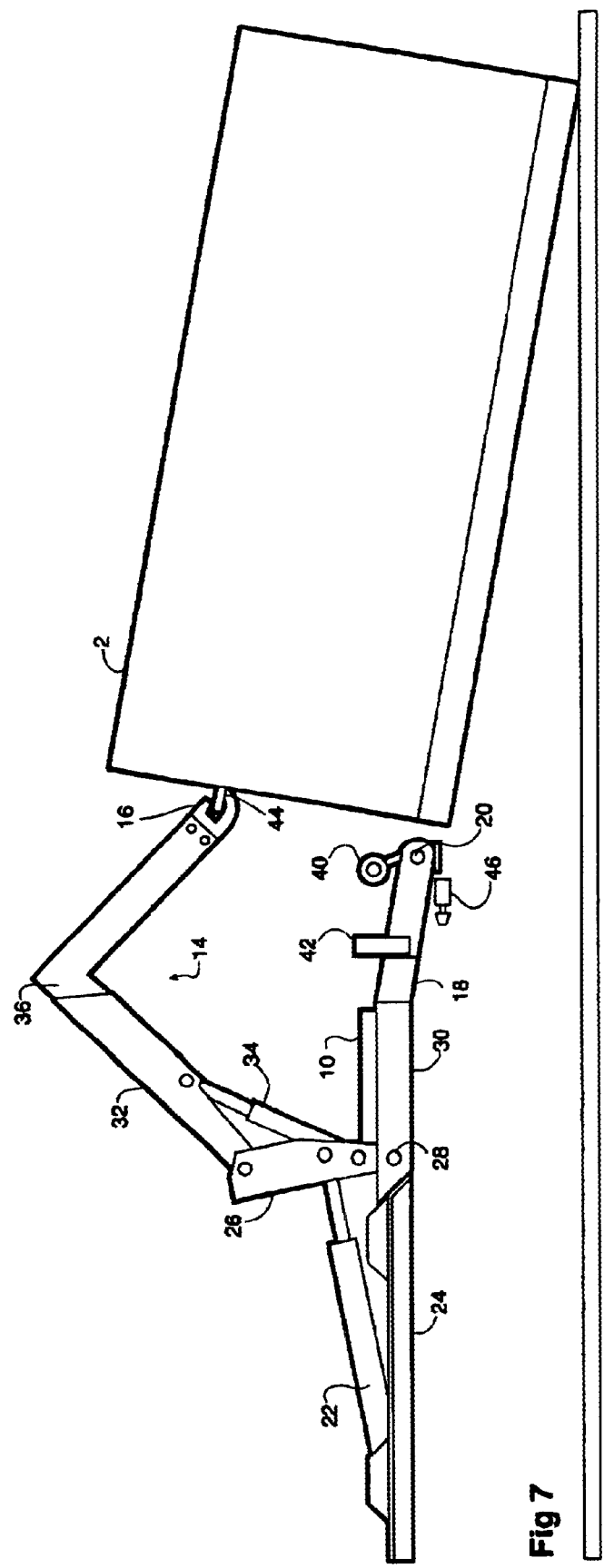

The device 1 comprises a protruding part, namely the hauling arm 14 which ends in a hook 16. This hook 16 allows containers 2 to be grasped and manoeuvred when the arm 14 is moved backwards, as depicted in FIGS. 5 to 7.

A loaded container can be tipped through the conventional presence of a tipper chassis 18 pivoting about a first pivot axis 20.

The tipping movement is brought about by powerful tipping means 22, in this particular instance, rams 22.

These rams 22 are mounted by their ends at the front part 24 of a chassis belonging to the device and are articulated to a link rod 26 mounted so that it can pivot on a second pivot axis 28 which is supported by arms 30 which extend the tipper 18.

When the device is at rest, as shown in FIG. 3, the arms 30 are aligned on the outside of the longerons 12, without impinging on the volume normally occupied by the fifth wheel 10. Moreover, their profile is designed so that they do not project upwards, so as not to impede manoeuvres particularly when the vehicle is equipped with a fifth wheel 10 used for towing.

The presence of a fifth wheel 10, the axis of which has, according to the regulations, to be located forward of the point at which the rear wheel and axle assembly of the vehicle rests, would present a conventional manoeuvring device with an insurmountable problem of dynamics. This problem does not arise with the device of the invention.

The hauling arm 14 which supports the hook 16 is in the shape of an L. The arm 32 of the L is mounted so that it can pivot at the free end of the link rod 26. A second set of rams 34 (which here comprises a single ram 34) allows the relative position of these two members 26, 32 to be varied. Furthermore, the arm 32 of the L comprise a telescopic part 36, which allows its length to be varied and the hooked part 38 of the L, which supports the hook 16, to be moved (see FIG. 8).

The way in which the various elements operate is described by the succession of FIGS. 3, 5, 6 and 7, which show various phases in the unloading of a container 2.

The container 2 rests via the rear on guide rollers 40. Latches 42 mounted on the assembly formed by the tipper 18 and the link rod 26 prevent any relative movement of the container during transport.

Having released the latches 42, the operator—generally the driver of the vehicle—actuates the ram 34, which causes the arm 38 to pivot and begins to raise the front of the container 2.

As the first set of rams 22 comes into play, the link rod tips, increasing the movement of the container 2.

The latter shifts towards the rear of the vehicle, supported and guided by the rollers 40 (FIG. 5).

The telescopic part 36 of the L-shaped arm is deployed (FIG. 6): the rear end of the container touches the ground. Contact with the rollers 40 is broken. It is essential, at this moment, that the front of the container should not catch on the rear of the vehicle, because if it were to catch, the handle 44 could disengage from the hook 16. To avoid such a risk, the pivot axis 20 of the tipper 18 is, in this device, a great deal lower down than the upper plane of the original chassis 8 of the vehicle. For that, during mounting, the rear end of the longerons 12 is cut, which represents a benign operation, so that a support 45 for the axis 20 can be fitted. Movement can therefore be completed without jolts, as shown in FIG. 7. A container 2 is loaded in precisely the same way, but performing the above described operations in reverse order.

The downwards movement of the pivot axis 20 has the advantage that, when the vehicle is used as a tractor, the travel with respect to a semitrailer is increased, as can be seen in FIG. 2. To accentuate this advantage still further, which advantage is appreciable particularly when the hitch encounters bumpy or very uneven ground, the rollers 40 are mounted in such a way that they can be retracted downwards. In this particular instance, the operator can, via a secondary ram, cause the axis carrying these rollers 40 to move in such a way that it stows itself below the first pivot axis (see FIG. 2). This operation, like all of the manoeuvres for unloading a container and coupling a semitrailer, incidentally, can be controlled by the driver of the vehicle without him having to leave his cab.

An axle locking mechanism 46 comprising an another secondary ram of horizontal axis is mounted in the region of the rear axle assembly. This provision leads to an immobilization of the relative positions of the chassis 8 and of the wheel set 48 without the rod of the operating ram being subjected to direct force, an advantage which is not insignificant by comparison with conventional devices which have a vertical axis.

Figure 4:
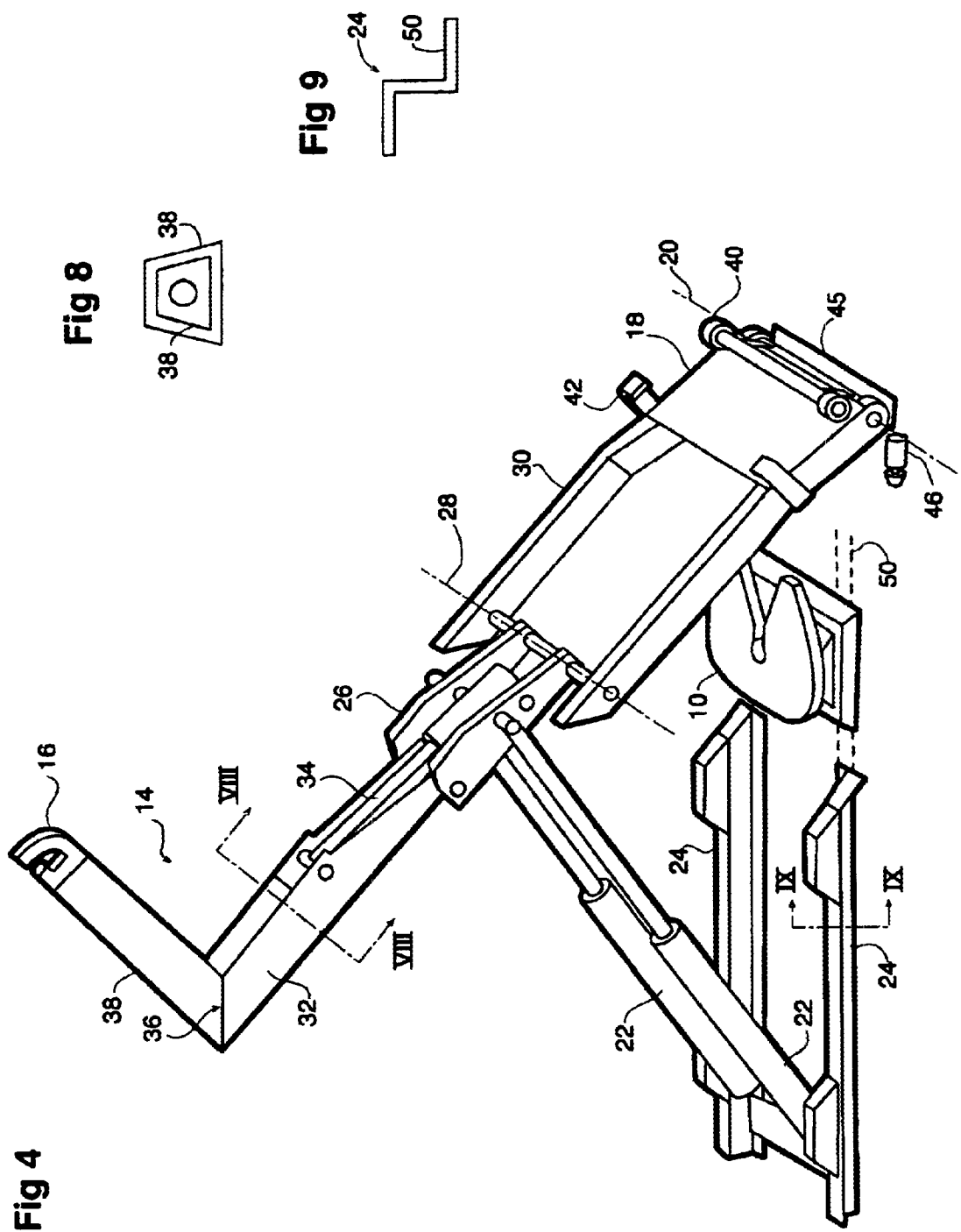
FIG. 4 is a perspective view of a device according to the invention, depicted in a tipping position.

FIG. 4 also shows an advantageous feature of the device according to the invention: the tipper 18 is produced not of crossed girders, as in the prior art, but from rigid sheet. In addition to the weight saving achieved, a tipper 18 such as this affords effective protection in the event of mistakes: any semitrailer 4 which might not have been correctly engaged will actually find nothing to catch on. The attachment manoeuvre can be rectified and continued with no damage to the mechanism or to the vehicle. Furthermore, delicate elements (the circuit for controlling the latches 42 and the retractable rollers 40) are effectively protected from knocks and the weather.

As was stated earlier, an essential point that has to be respected is that the device 1 must not excessively increase the tare of the vehicle. This is why, in particular, recourse is preferably had to a lightened chassis in which the longerons 12 of the vehicle chassis 8 alone transmit the (reduced) loads between the part 24 and the pivot axis 20. As specified earlier, the rear end of these longerons 8 is reworked within the limits permitted by the manufacturers in order to obtain the downwards offset of the axis 20.

Figure 11:
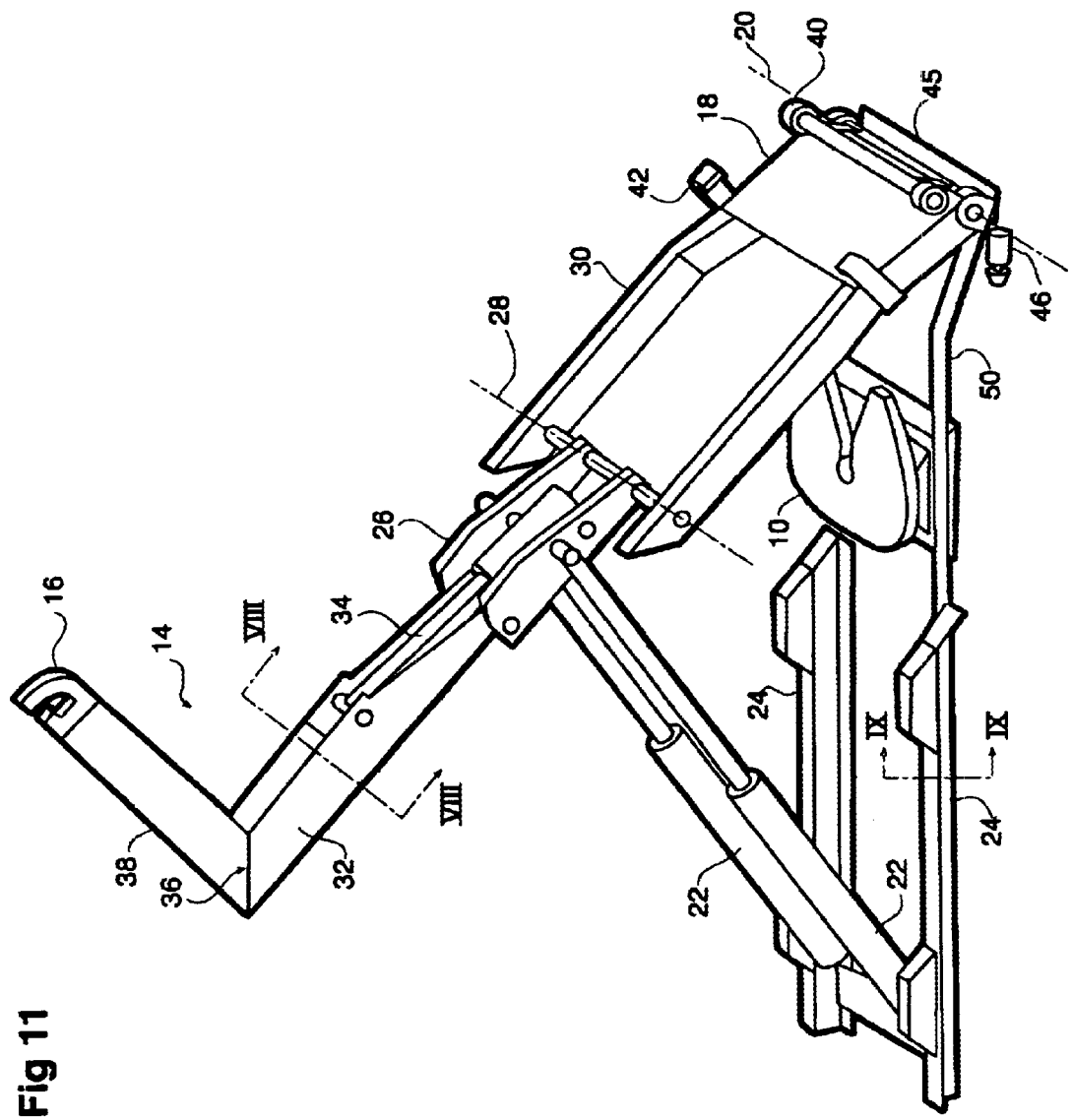
FIG. 11 is a perspective view similar to FIG. 4 of another embodiment of the invention.

It goes without saying that, depending on the desire, the device 1 could perfectly well be equipped with a continuous chassis as shown in FIG. 11 where a lowered longeron connects the front and rear parts of the chassis.

Furthermore, the presence of the link rod 26 and its articulation with respect to the L-shaped arm lead to a weight saving which is appreciable although not immediately obvious; because of the forward position of the link rod 26, the rams 22 connected to this link rod 26 develop a far more effective torque, and their diameter (and therefore their weight) and compressed-fluid consumption can therefore be reduced. By using a trapezoidal cross section for the base 32 of the arm 14 (as represented at FIG. 8) it is possible, for the same rigidity, to use considerably thinner sheets, this too resulting in a weight saving.

Figure 10:
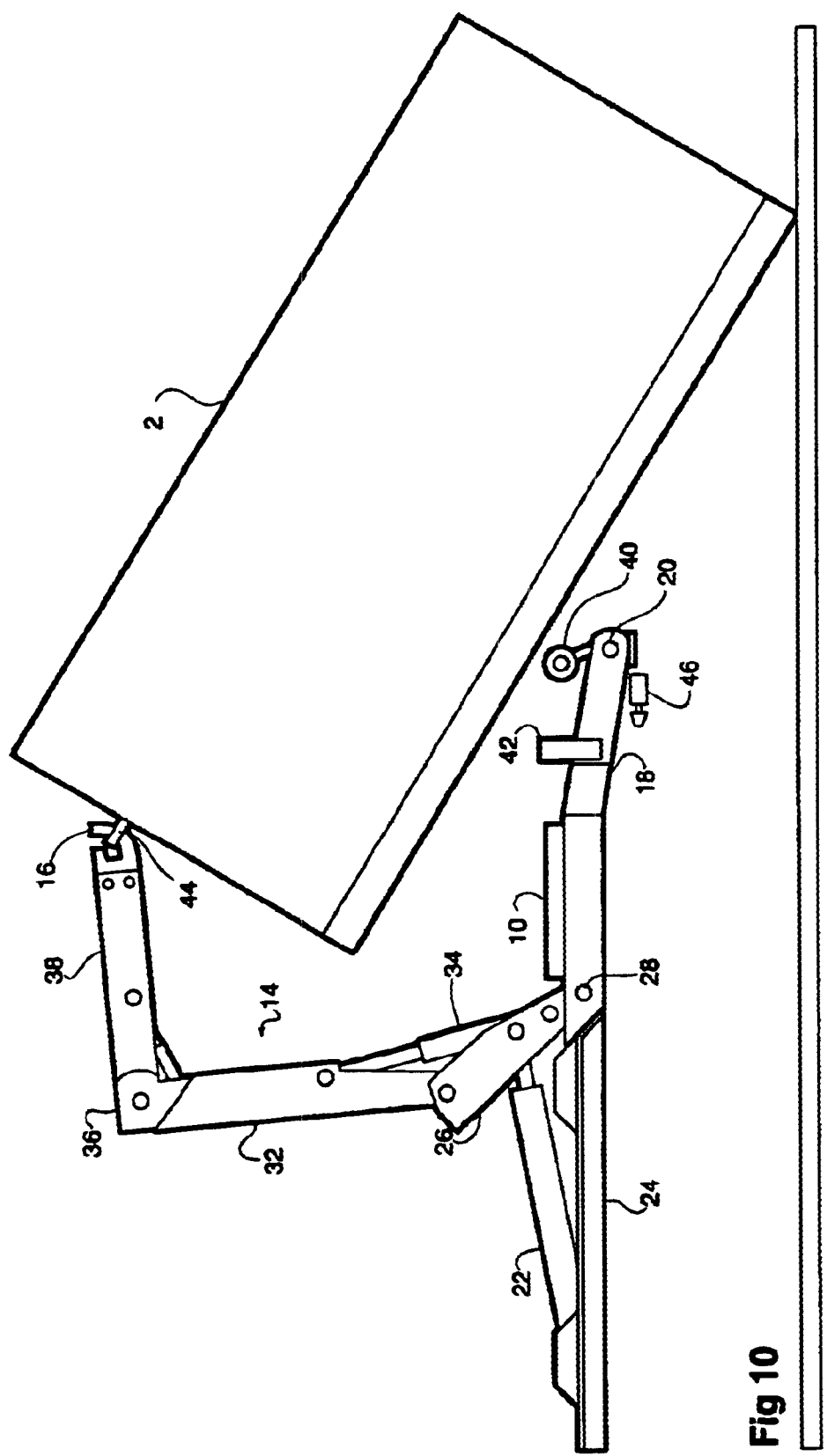
FIG. 10 is a side view corresponding to FIG. 6 of another embodiment of the invention.

FIG. 10 is a side view corresponding to FIG. 6 of another embodiment of the invention. In this embodiment, the base of the L-shaped arm is further articulated with respect to its hooked part.

What is claimed is:

1. A device for handling a container for an automotive vehicle, comprising:
    a pivotable L-shaped hauling arm having a free end with a hook,
    a tipper pivotable about a first horizontal axis, actuating members for actuating said tipper,
    rollers for guiding the container,
    said tipper being connected to a rear part of a vehicle chassis by said first horizontal axis and having arms supporting a second pivot axis, said second pivot axis being located forward of a point at which the vehicle chassis rests on a rear axle assembly, said rear part supporting the first horizontal axis at a position disposed below an upper plane of the vehicle chassis,
    a link rod pivotably mounted on the second pivot axis, said link rod rotatably supporting the L-shaped arm, said actuating members being connected to said link rod between said second axis and its rotatable support of the L-shaped arm,
    a further actuating member connecting said link rod and the L-shaped arm, said L-shaped arm having a first arm portion rotatably supported by said link rod at said second pivot axis and a second arm portion which carries said hook, said first and second arm portions being connected telescopically to enable said first arm portion to vary in length, and
    a fifth wheel fixed to the vehicle chassis and having an axis located forward of the point at which the vehicle chassis rests on the rear axle assembly, said arms of said tipper being located on opposite sides of said fifth wheel when the device is in a rest position.

2. A device according to claim 1, wherein said link rod comprises first and second plates disposed on opposite sides of said L-shaped arm, each plate of said link rod being connected at a first point to a respective said actuating member for said tipper and said first and second plates being connected on said second pivot axis and to said L-shaped arm.

3. A device according to claim 2, wherein one of said first and second plates is connected to said further actuating member, at a point offset from its point of connection to the L-shaped arm.

4. A device according to claim 1, wherein said first arm portion of the L-shaped arm has a base with a trapezoidal cross section.

5. A device according to claim 1, wherein said first arm portion of the L-shaped arm is articulated with respect to said hook.

6. A device according to claim 1 wherein the front and rear parts of the chassis of the device are connected by a lowered longeron which does not protrude above an upper plane of the vehicle chassis.

7. A device according claim 1, wherein the front and rear parts of the chassis of the device are fixed directly to the vehicle chassis independently of one another.

8. A device according to claim 1, wherein a means for securing a container is arranged on a part formed by the tipper and the link rod.

9. A device according to claim 1 wherein the rollers can be retracted downwards.

10. A device according to claim 1, wherein said actuating members for actuating the tipper are supported at a front portion of the vehicle chassis for undergoing pivotal movement.

11. A device according to a claim 1 wherein the fifth wheel is equipped with a device for automatically securing a kingpin.

12. A device according to claim 1, wherein when the device is in a position of rest, the tipper and its arms are arranged outside of longerons that form the vehicle chassis.

13. An automotive vehicle equipped with a front cab and a rear chassis fitted with a container handling device, said container handling device comprising a pivotable L-shaped hauling arm having a free end with a hook, a tipper pivotable about a first horizontal axis, actuating members for actuating said tipper, rollers for guiding the container, said device including chassis comprising a front part and a rear part, said rear part supporting a second pivot axis, said second pivot axis being located forward of a point at which the vehicle chassis rests on a rear axle assembly, said rear part supporting the first horizontal axis at a position disposed below an upper plane of the vehicle chassis,
    said tipper being connected to said rear part by said first horizontal axis and having arms supporting said second pivot axis, a link rod pivotably mounted on the second pivot axis, said link rod rotatably supporting the L-shaped arm, said actuating members being connected to said link rod between said second pivot axis and its rotatable support of the L-shaped arm, a further actuating member connecting said link rod and the L-shaped arm, said L-shaped arm having a first arm portion rotatably supported by said link rod at said second pivot axis and a second arm portion which carries said hook, said first and second arm portions being connected telescopically to enable said first arm portion to vary in length, and a fifth wheel fixed to the vehicle chassis and having an axis located forward of the point at which the vehicle chassis rests on the rear axle assembly, said arms of said tipper being located on opposite sides of said fifth wheel when the device is in a rest position.

14. A device according to claim 13, wherein said actuating members for actuating the tipper are supported at a front portion of the vehicle chassis for undergoing pivotal movement.

15. A device according to claim 13, wherein said fifth wheel is fixed to the vehicle chassis in a position not interfering with the container hauling device in loading and unloading a container on the vehicle while when hauling a trailer, the container handling device does not interfere with the hauling of the trailer and its cooperation with the fifth wheel.

* * * * *